3,360,486
PRODUCTION OF EPOXIDE RESINS FROM AROMATIC AMINES IN THE PRESENCE OF A HYDROXYL GROUP-CONTAINING PROMOTER

Edward William Garnish, Saffron Walden, England, assignor to Ciba Limited, Basel, Switzerland, a company of Switzerland
No Drawing. Filed June 9, 1964, Ser. No. 373,822
Claims priority, application Great Britain, June 26, 1963, 25,469/63
8 Claims. (Cl. 260—2)

ABSTRACT OF THE DISCLOSURE

The production of poly(N-glycidylamines) by the reaction of an aromatic amine with an epihalohydrin is accelerated by effecting the reaction in the presence of a promoter which comprises the reaction product of a phenol or an alcohol with an epihalohydrin. The reaction mixture is subsequently dehydrohalogenated to form the polyepoxide.

---

This invention relates to epoxide resins, to processes for their production, and to their use.

Aromatic amines containing one or more active hydrogen atoms attached to nitrogen can be caused to react with epihalohydrins. It has been shown that this reaction is catalysed by boron trifluoride if the amine is a very weak base. In other cases a long reaction time and/or a solvent system containing hydroxyl groups, e.g., a monohydric alcohol or water, to facilitate the reaction are used. The intermediate products obtained are treated with alkali to yield epoxide resins. It has also been shown that useful resins may be prepared from an epihalohydrin and mixtures of aromatic amines and phenols, the phenolic hydroxyl groups catalytically promoting a rapid, smooth reaction between the aromatic amine and the epihalohydrin.

The present invention provides a novel process for the production of epoxide resins, being mixtures of compounds containing on average more than one 1,2-epoxide group per molecule, which comprises (a) reacting an aromatic mono- or poly-amine containing at least two hydrogen atoms attached directly to nitrogen with an epihalohydrin in the presence of a promoter formed by the partial or complete reaction of a phenol or alcohol with an epihalohydrin, and (b) treating the resultant mixture with an alkali, the quantity of alkali being at least equivalent to the total amount of reacted epihalohydrin.

The process of this invention thus involves three distinct reactions. The first is the preparation of the promoter by the partial or complete reaction of a phenol or alcohol with an epihalohydrin. The second reaction is the interaction of the epihalohydrin with the aromatic mono- or poly-amine in the presence of the promoter, and the third reaction is the dehydrohalogenation of the resultant mixture with an alkali.

The resins so produced may be liquids to brittle solids, depending on the starting materials and reaction conditions. Useful, infusible masses may be prepared from the resins by reacting them with known hardeners for epoxide resins.

The preferred monohydric phenols which may be used to prepare the promoter are phenol, o-, m- or p-cresol, and the xylenols. Preferred polyhydric phenols are resorcinol, hydroquinone, bisphenol A (2,2-bis(p-hydroxyphenyl)propane) and bisphenol S (bis(p-hydroxyphenyl) sulfone). The preferred monohydric alcohols are propan-1-ol, propan-2-ol and butan-1-ol, while preferred polyhydric alcohols are ethylene glycol, butane-1,4-diol and glycerol. The epihalohydrin is preferably epichlorohydrin.

Methods of causing these hydroxyl compounds to react with epihalohydrins are well known. Thus, the reaction can be catalysed by an alkali metal hydroxide, and alkali metal salt, a salt of a tertiary amine, or a quaternary ammonium compound. The reaction between an alcohol and an epihalohydrin can also be catalysed by Lewis acids such as boron trifluoride or stannic chloride. Products suitable for use as the promoter in the process of the invention include both those wherein not all the hydroxyl groups of the original material have reacted with the epihalohydrin and those wherein the halohydrin groups in the product formed have been partially converted into epoxy groups, as well as those wherein all the hydroxyl groups of the original material have reacted but none of the halohydrin groups formed have been converted into epoxy groups. By suitable adjustment of the conditions, the reaction can be interrupted before the reaction of the hydroxyl compound with the epihalohydrin is complete. The halohydrin groups in the product can be partially reacted with alkali to convert them into epoxy groups. The formation of the promoter is conveniently carried out in the presence of excess epihalohydrin which is utilised in the second reaction. Solvents to control viscosity may also be added, and this reaction may be carried out at any temperature between 20° C. and 150° C., but is preferably effected at between 35° C. and 80° C.

Preferably, aniline, o- or p-toluidine, m- or p-chloroaniline, p-aminophenol, bis(p-aminophenyl)methane, bis(p-methylaminophenyl)methane, bis(p-aminophenyl) ketone, or bis(p-aminophenyl)sulphone is employed as the aromatic amine for the second reaction, but other aromatic amines, e.g., m-toluidine, p-anisidine, p-phenetidine, or benzidine, can also be used. The molar ratio of prmoter to aromatic amine may be as low as 1:33, but preferably a ratio of at least 1:10 is employed.

In the second reaction the aromatic amine is added to the promoter together with any epihalohydrin required to complete the reaction or any solvent necessary to keep the viscosity of the mixture at a workable level. The reaction may be carried out at any temperature between 20° C. and 150° C. but is preferably effected between 50° C. and 80° C.

In the third reaction the resin is formed by treating the reaction mixture from the second reaction with an aqueous solution of an alkali metal or alkaline earth metal hydroxide, if necessary with the addition of a solvent. Sodium and potassium hydroxides are especially suitable.

The resins produced in accordance with this invention, either alone or in admixture with other epoxide resins, may be hardened with polybasic acids or acid anhydrides, aromatic or aliphatic polyamines, Lewis acids such as boron trifluoride or complexes of the same, polyhydric phenols or phenolic novolaks, and other konwn hardeners for epxide resins. Compositions comprising a resin produced in accordance with the invention and a hardener, with or without another epoxide resin, are within the scope of the invention. Such compositions may also contain fillers, plasticisers or colourants, and may be employed in the preparation of castings, encapsulations, laminates, surface coatings and adhesives or as dough-moulding compositions.

The following examples will serve to illustrate the invention.

Example 1

Benzyltrimethylammonium chloride (1.6 g.) was added to Bisphenol A (28.5 g., 0.25 equiv.) dissolved in epichlorohydrin (92.5 g., 1 equiv.) and the mixture held at 40° C. for forty hours. During this time the epoxide equivalent rose to 167 (calculated value 163). Bis(p- aminophenyl)methane (37.2 g., 0.75 equiv.) was added and the mixture heated at 60° C. In four hours over 95% of the epichlorohydrin had been consumed and the viscosity of the mixture had increased greatly. The intermediate was taken up in toluene-ethanol (3:1, 160 ml.) and the mixture stirred vigorously for two hours at 60° C. with 120 g. of a 40% w./w. aqueous solution of sodium hydroxide. Precipitated salt was dissolved in water. The organic layer was separated, neutralised, and evaporated to yield an amber solid resin (108 g.) having an epoxide value of 4.64 equiv./kg.

*Example II*

Stannic chloride (0.3 ml.) was added to dry propan-2-ol (30 g.) and the stirred solution held at 50–60° C. while epichlorohydrin (23.1 g.) was added dropwise over twenty minutes. The temperature was maintained at 50–60° C. for a further hour, and then sodium hydroxide (1 g. in 2 ml. water) was added to destroy the catalyst. The mixture was filtered and the filtrate evaporated under vacuum to isolate crude 3-chloro-2-hydroxypropyl isopropyl ether.

A solution of this intermediate in epichlorohydrin (92.5 g.) was stirred at 65–70° C. while bis(p-aminophenyl)methane (49 g.) was added in portions over thirty minutes. After four hours at the same temperature the viscous liquid was taken up in toluene and ethanol (3:1, 180 ml.) and stirred vigorously for two hours at 65–70° C. with 300 g. of an 18% w./w. aqueous solution of sodium hydroxide. The organic layer was separated, neutralised and evaporated to yield 104 g. of a viscous brown resin having an epoxide value of 7.73 equiv./kg.

*Example III*

Bisphenol A (28.5 g.) was dissolved in epichlorohydrin (100 g.) at 65–70° C. and sodium hydroxide (0.5 g. in 10 ml. of a 1:1 mixture of water and industrial methylated spirits) added with stirring. There was a slightly exothermic reaction, the temperature rising above 68° C. for about forty minutes. Two hours after the addition the mixture was refluxed in a flask provided with a fractionating column to remove ethanol as an overhead distillate; the fractionating column was then replaced by an entraining separator to remove water. The residue was cooled to 65° C. and bis(p-aminophenyl)methane (37.2 g.) added over thirty minutes while the mixture was held at 65–70° C. After a further four hours at this temperature, the viscous liquid was taken up in toluene-industrial methylated spirits (3:1, 180 ml.) and stirred for two hours at 70° C. with 250 g. of an 18% aqueous solution of sodium hydroxide. The product was isolated as in Example II as a very viscous brown resin: yield 112 g., epoxy value, 6.31 equiv./kg.

*Example IV*

Bisphenol A (28.5 g.) and epichlorohydrin (95 g.) were refluxed with stirring in an apparatus provided with an entrainer separator, and sodium hydroxide (5 g. in 6 ml. water) added dropwise over thirty minutes. At the end of a further hour 8.2 ml. of water (almost the calculated amount) had been collected in the entrainer. The mixture was then maintained at 60° C. while bis(p-aminophenyl)methane (37.2 g.) was added over thirty minutes. The mixture was kept at 60° C. a further four hours and the last stage was carried out as described in Example III. An amber, solid resin (105 g.) was isolated having an epoxide value of 5.58 equiv./kg.

*Example V*

Phenol (23.5 g., 0.25 equiv.) and epichlorohydrin (185 g.) were treated with 5 g. of NaOH in 6 ml. of water at the reflux temperature as in Example IV: 8.3 ml. of water (the calculated amount) collected in the entraining apparatus. A sample of the reaction liquid was titrated against a solution of hydrogen bromide in glacial acetic acid. The calculated equivalent weight is 108.5: the observed value was 112. The reaction mixture was treated with bis(p-aminophenyl)methane (37.2 g.) as in Example IV. At the end of the reaction period the combined epoxide and nitrogen equivalent weight was 161.5 (by titration against a solution of hydrogen bromide in glacial acetic acid); the calculated value is 160.5. The last stage of the process was carried out as described in Example III. An amber, viscous resin (108 g.) was isolated having an epoxide value of 5.76 equiv./kg.

*Example VI*

Resorcinol (13.7 g., 0.25 equiv.) and epichlorohydrin (100 g.) were treated at 60° C. with sodium hydroxide (0.5 g.) in water (2 ml.). The temperature was held for one hour, then the mixture was refluxed, water being removed in an entraining apparatus. At the end of this time titration of a sample showed that 0.20 equiv. of epichlorohydrin had been consumed. The reaction mixture was treated with bis(p-aminophenyl)methane (37.2 g.) as in Example IV. The intermediate was taken up in toluene-industrial methylated spirits (3:1, 180 ml.) and stirred vigorously with 250 g. of a 20% w./w. aqueous solution of sodium hydroxide for 2.5 hours. The product (91.5 g.), isolated as in Example II, was a viscous amber liquid having an epoxy value of 7.34 equiv./kg.

*Example VII*

Resorcinol (13.7 g.) and epichlorohydrin (100 g.) were treated with 5 g. of sodium hydroxide in 6 ml. of water as in Example IV; 7.9 ml. of water collected in the entrainer. Titration of a sample of the reaction liquid indicated the epoxide equivalent to be 116; the value calculated on the basis of the amount of water recovered is 107. The reaction mixture was treated with bis(p-aminophenyl)methane (37.2 g.) as in Example IV, the last stage being carried out as in Example VI. A very viscous amber liquid (95.2 g.) was isolated, having an epoxy value of 6.64 equiv./kg.

*Example VIII*

The reaction between resorcinol and epichlorohydrin described in Example VII was repeated: at the end the epoxide equivalent was shown by titration to be 114.

p-Toluidine (40.2 g., 0.75 equiv.) was then added, the temperature being held at 60° C. Samples of the reaction mixture were titrated as before. In four hours 96% of the expected fall in epoxide content had occurred. At the same time a blank mixture containing no promoter was also sampled and titrated. This mixture comprised p-toluidine (40.2 g.), epichlorohydrin (88.5 g.) and benzene (25 g.). In 4 hours, 15 minutes only 42% of the expected fall in epoxide content had occurred. The last stage of the process using the promoter was carried out as described in Example VI. The product (99 g. of a syrupy amber liquid) had an epoxide value of 6.37 equiv./kg.

*Example IX*

Stannic chloride (0.3 ml.) was added to butane-1,4-diol (30 g., 0.6 equiv.) and the stirred solution held at 50–60° C. while epichlorohydrin (62 g., 0.6 equiv.) was added over twenty minutes. The temperature was maintained at 50–60° C. for a further hour, and then sodium hydroxide (1 g. in 2 ml. water) was added to destroy the catalyst. The mixture was filtered.

The clear filtrate was diluted with epichlorohydrin (187 g., 2 mol). The mixture was held at 60–65° C. while bis(p-aminophenyl)methane (99 g., 2 equiv.) was added in portions over thirty minutes. After four hours at the same temperature, the viscous liquid was taken up in toluene and ethanol (3:1, 250 ml.) and stirred vigorously for two hours at 60–65° C. with 220 g. of a 40% w./w. equeous solution of sodium hydroxide. The organic layer was separated, neutralised and evaporated to yield 224 g. of a viscous brown resin having an epoxide value of 6.35 equiv./kg.

Example X

The resins of Examples I to VIII were mixed with the stoichiometric amount of methylendomethylenetetrahydrophthalic anhydride and cured for 1 hour at 120° C. and then for 4 hours at 220° C. The properties of the casting were determined according to A.S.T.M. specification D790–59T.

| Resin of Example | Deformation temperature under load (° C.) | Flexural strength (kg./sq. cm.) | Modulus in flexure (kg./sq. cm.) |
|---|---|---|---|
| I | 220 | 753 | $3.67 \times 10^4$ |
| II | 246 | 591 | $3.74 \times 10^4$ |
| III | 225 | 725 | $3.52 \times 10^4$ |
| IV | 237 | 773 | $3.35 \times 10^4$ |
| VI | 248 | 740 | $3.71 \times 10^4$ |
| VII | 239 | 726 | $3.74 \times 10^4$ |
| VIII | 187 | 1055 | $3.94 \times 10^4$ |

Example XI

Samples of the resin of Example IX were mixed with the stoichiometric amount of various hardening agents and cured. The flexural strengths of the resultant castings were determined according to A.S.T.M. specification D790–59T; the term "Martens value" denotes that obtained in a modification of the D.I.N. procedure in which a smaller sample is employed.

| Hardening Agent | Curing Conditions | Martens Value (° C.) | Flexural Strength (kg./sq cm.) |
|---|---|---|---|
| Triethylenetetramine | 16 hours/room temp. +1 hour/100° C. | 143 | 609 |
| Hexahydrophthalic anhydride | 2 hours/180° C. +1 hour/150° C. | 165 | 1075 |
| Bis(p-aminophenyl)-methane | 1 hour/80° C. +1 hour/150° C. | 226 | 1155 |

What is claimed is:

1. Process for the production of epoxide resins containing on average more than one 1,2-epoxide group per molecule which consists essentially of (a) reacting an aromatic amine containing at least two hydrogen atoms attached directly to nitrogen with an epihalohydrin in the presence of a promoter formed by reaction of a member selected from the group consisting of phenols and alcohols having not more than three alcoholic hydroxyl groups per molecule with an epihalohydrin, opening the 1,2-epoxy group of the epihalohydrin and (b) treating the resulting mixture with an alkali selected from the group consisting of alkali metal hydroxides and alkaline earth metal hydroxides, the quantity of alkali being at least equivalent to the total amount of reacted epihalohydrin.

2. Process as claimed in claim 1, wherein the molar ratio of the promoter to the aromatic amine is at least 1:10.

3. Process as claimed in claim 1, wherein the reaction between the aromatic amine and the epihalohydrin in the presence of the promoter is carried out at a temperature between 20° C. and 150° C.

4. Process as claimed in claim 3, wherein the said reaction is carried out at a temperature between 50° C. and 80° C.

5. Process as claimed in claim 1, in which the epihalohydrin is epichlorohydrin.

6. Process as claimed in claim 1, wherein the aromatic amine is a member selected from the group consisting of aniline, o- and p-toluidine, m- and p-chloroaniline, p-aminophenol, bis(p-aminophenyl)methane, bis(p-methylaminophenyl)methane, bis(p-aminophenyl)ketone and bis(p-aminophenyl)sulfone.

7. Process as claimed in claim 1, wherein the promoter is formed by reacting a member selected from the group consisting of phenol, o- m- and p-cresol, xylenols, resorcinol, hydroquinone, 2,2-bis-(p-hydroxyphenyl)propane and bis-(p-hydroxyphenyl)sulfone with an epihalohydrin.

8. Process as claimed in claim 1, wherein the promoter is formed by reacting a member selected from the group concisting of propan-1-ol, propan-2-ol, butan-1-ol, ethylene gylcol, butane-1,4-diol and glycerol with an epihalohydrin.

References Cited
UNITED STATES PATENTS

| | | | |
|---|---|---|---|
| 3,033,803 | 5/1962 | Price et al. | 260—2 |
| 3,248,353 | 4/1966 | Coscia | 260—2 |

WILLIAM H. SHORT, *Primary Examiner.*

T. E. PERTILLA, *Assistant Examiner.*